United States Patent [19]

Durst et al.

[11] Patent Number: 4,830,175

[45] Date of Patent: May 16, 1989

[54] ICE CREAM CONVEYOR LINE CLEANING SYSTEM

[75] Inventors: Richard E. Durst; Edward M. Wight, both of Austin, Tex.

[73] Assignee: APV Glacier Industries, Inc., Austin, Tex.

[21] Appl. No.: 101,190

[22] Filed: Sep. 25, 1987

[51] Int. Cl.⁴ .................................... B65G 45/00
[52] U.S. Cl. ................................. 198/495; 62/303; 62/374; 62/380; 134/151
[58] Field of Search ............... 198/495, 500, 788, 838, 198/845, 841, 811; 62/303, 374, 380; 134/151, 153

[56] References Cited

U.S. PATENT DOCUMENTS

| Re. 29,477 | 11/1977 | Wight | 62/380 |
| 2,751,064 | 6/1956 | Russell | 198/778 |
| 3,528,259 | 9/1970 | Saal | 198/495 |
| 3,584,471 | 6/1971 | Powell et al. | 62/380 |
| 4,416,120 | 11/1983 | Yono et al. | 62/303 |

Primary Examiner—Joseph S. Valenza
Attorney, Agent, or Firm—Lahive & Cockfield

[57] ABSTRACT

A conveyor line system for carrying frozen comestibles in which the conveyor line support rail is formed of an elongated aluminum extrusion having incorporated within it a fluid passage extending along its length with radially and longitudinally spaced orifices for washing the conveyor line assembly during a cleaning cycle.

6 Claims, 4 Drawing Sheets

ICE CREAM CONVEYOR LINE CLEANING SYSTEM

TECHNICAL FIELD

The present invention relates to a conveyor line for the production of frozen comestibles and more particularly to a support rail including built in cleaning system for such a line.

Systems for the manufacture of ice cream novelties and other frozen comestibles are well known in the art. In general such systems include a conveyor line carrying trays past ice cream depositing or forming work stations and into a freezing chamber. Within the freezing chamber is a conveyor line which follows an elongated spiral path to provide a sufficient time period within the chamber for freezing the comestibles. Such a system is shown, for example, in U.S. Pat. No. Reissue 29,477 issued Nov. 22, 1977. As generally illustrated in that patent, the conveyor lines within the freezer are supported on rails, which confine and support the conveyor chain. Processors engaged in the production of foodstuffs, particularly dairy products have understandable concerns that the system be maintained in a clean state. Consequently the temperature of the freezing chamber is elevated to room temperature at regular intervals, for example, once a week to wash down the system. In general this has been accomplished by pressure hoses or other conventional washing systems. However, it is difficult to reach all of the crevices and interior portions of a relatively complex conveyor line such as that illustrated in the referenced patent.

OBJECTS AND SUMMARY OF THE INVENTION

It is therefore an object of the present invention to provide an improved conveyor line system which includes a built in cleaning system incorporated within the conveyor system itself to provide for thorough cleansing of all of the parts of the conveyor line within the freezing chamber including the main support structure.

It is another object of the invention to provide conveyor line support rails which incorporate fluid passages and spray orifices through which can be passed pressurized cleaning fluid when the system is brought up to room temperature for cleaning purposes.

Broadly speaking in the present invention the conveyor line system has conveyor line support rails supporting the flexible chain and the plates attached to that chain, all mounted on an aluminum extrusion rail. This extrusion incorporates in its lower portion a tube extending the length of the rail and having openings distributed radially and longitudinally in it. During a wash cycle, rinsing and washing fluid may be provided through the fluid passage formed in the tube to generate sprays from the openings in the tube thereby cleaning the portions of the conveyor assembly both above and below this tube.

DESCRIPTION OF PREFERRED EMBODIMENTS

Figure 1:
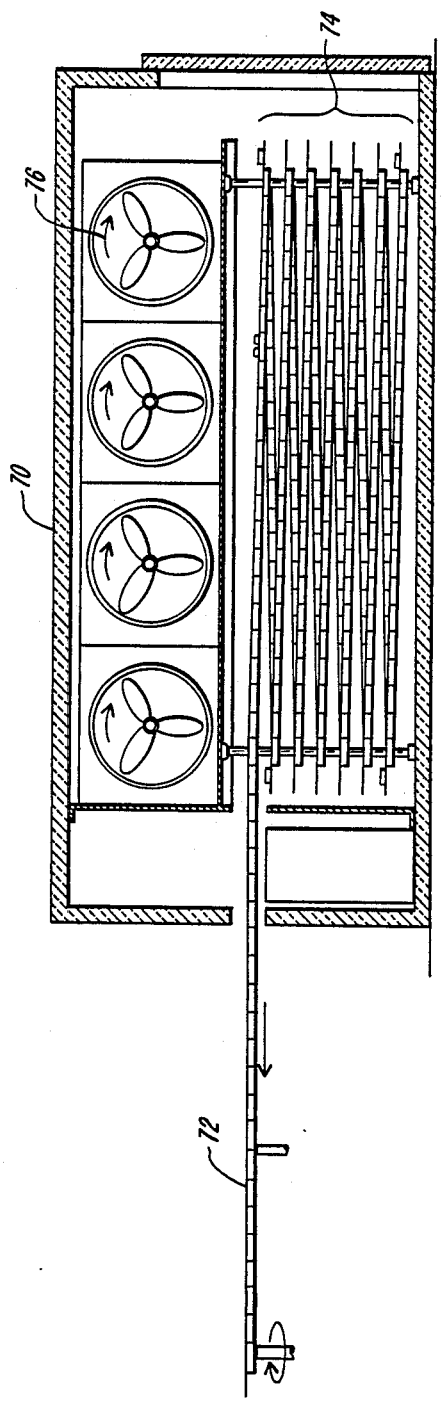
FIG. 1 is an illustration of a prior art conveyor system for the manufacturing of ice cream novelty.

FIG. 1 is an illustration in cross sectional view of a prior art conveyor freezing system in which the conveyor line 72 is seen passing from the external area where products are formed, into the freezing chamber 70 which is normally maintained at extremely low temperatures to freeze the soft ice cream products or other comestibles during the passage of the conveyor within chamber. The strand of the conveyor 72, which is taken outside of the chamber conveys the frozen products on the outbound side and brings in the just formed soft ice cream products or other comestibles on the inward side. The conveyor is formed as an elongated spiral cylinder 74 within the freezing chamber to provide a sufficient dwell period for the products to be frozen hard. Fans 76 provide for circulating the air within the chamber past refrigeration coils and through the conveyor system.

Figure 2:
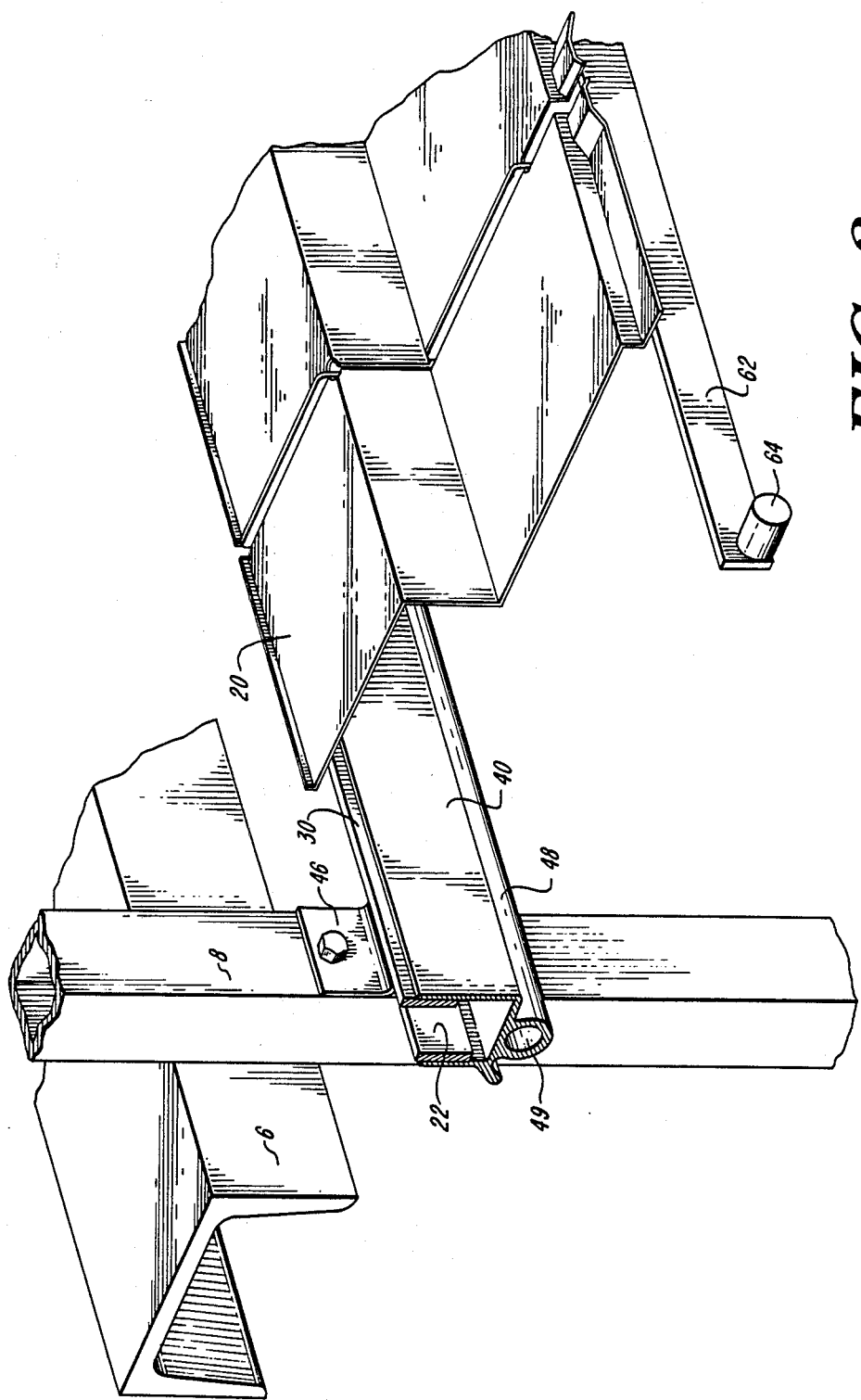
FIG. 2 is a simplified isometric view of a portion of a conveyor line embodying this invention.

FIG. 2 is a simplified isometric view of portions of the conveyor line rail support system. The conveyor line and other specific elements have been deleted for simplification. This view is intended to show the general relationship of the rail extrusion 40 to the product plates 20 and the outboard rail 62 supporting the outer end of the product plate. The vertical beam member 8 is shown attached to the main fixed structural horizontal beam 6 of the conveyor.

Figure 3:
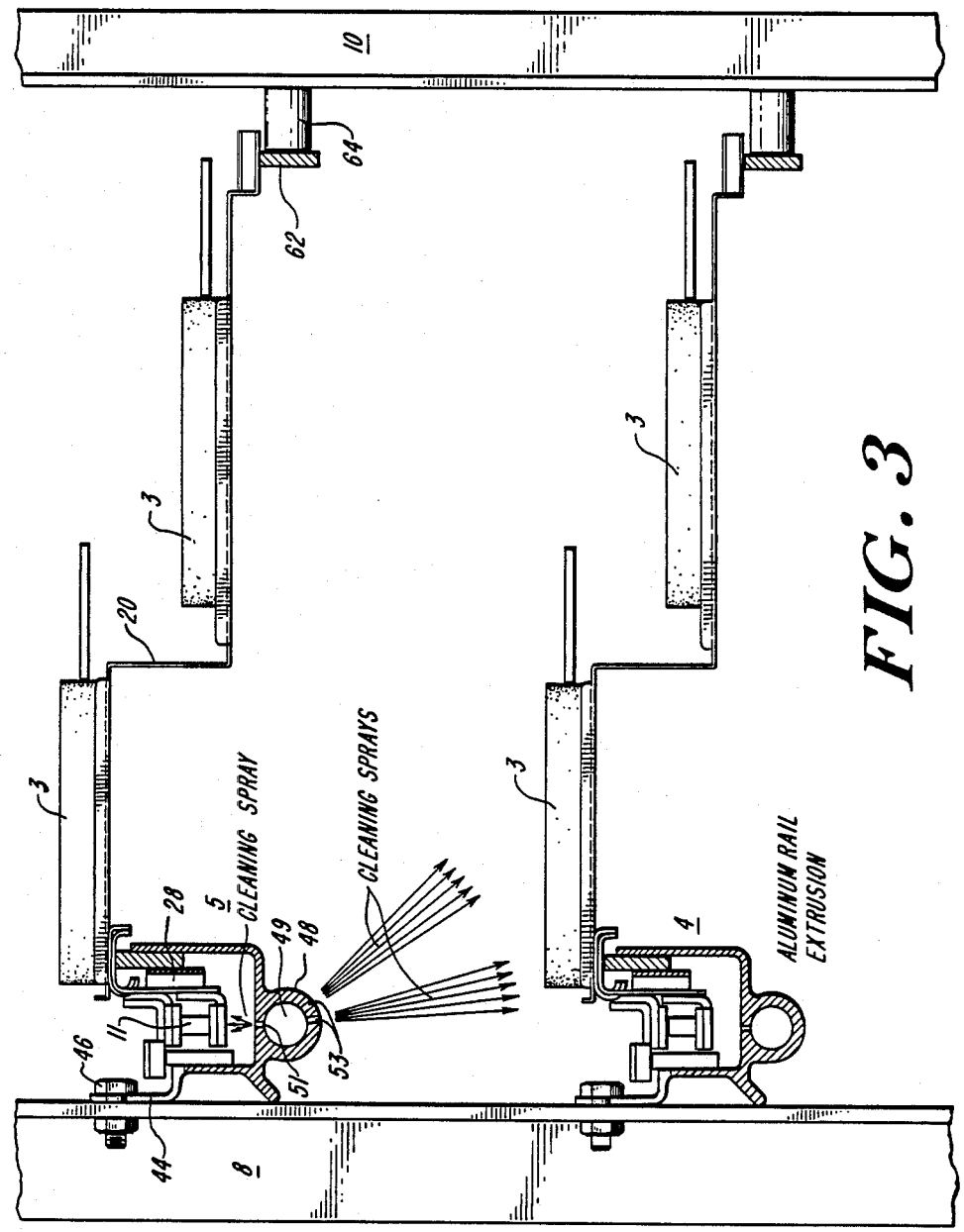
FIG. 3 is an illustration in cross sectional view of the conveyor line support system of FIG. 2.

FIG. 3 shows a cross sectional view of the conveyor line rail support illustrating two vertically displaced portions of the conveyor system as it exists within the freezing chamber.

Figure 4:
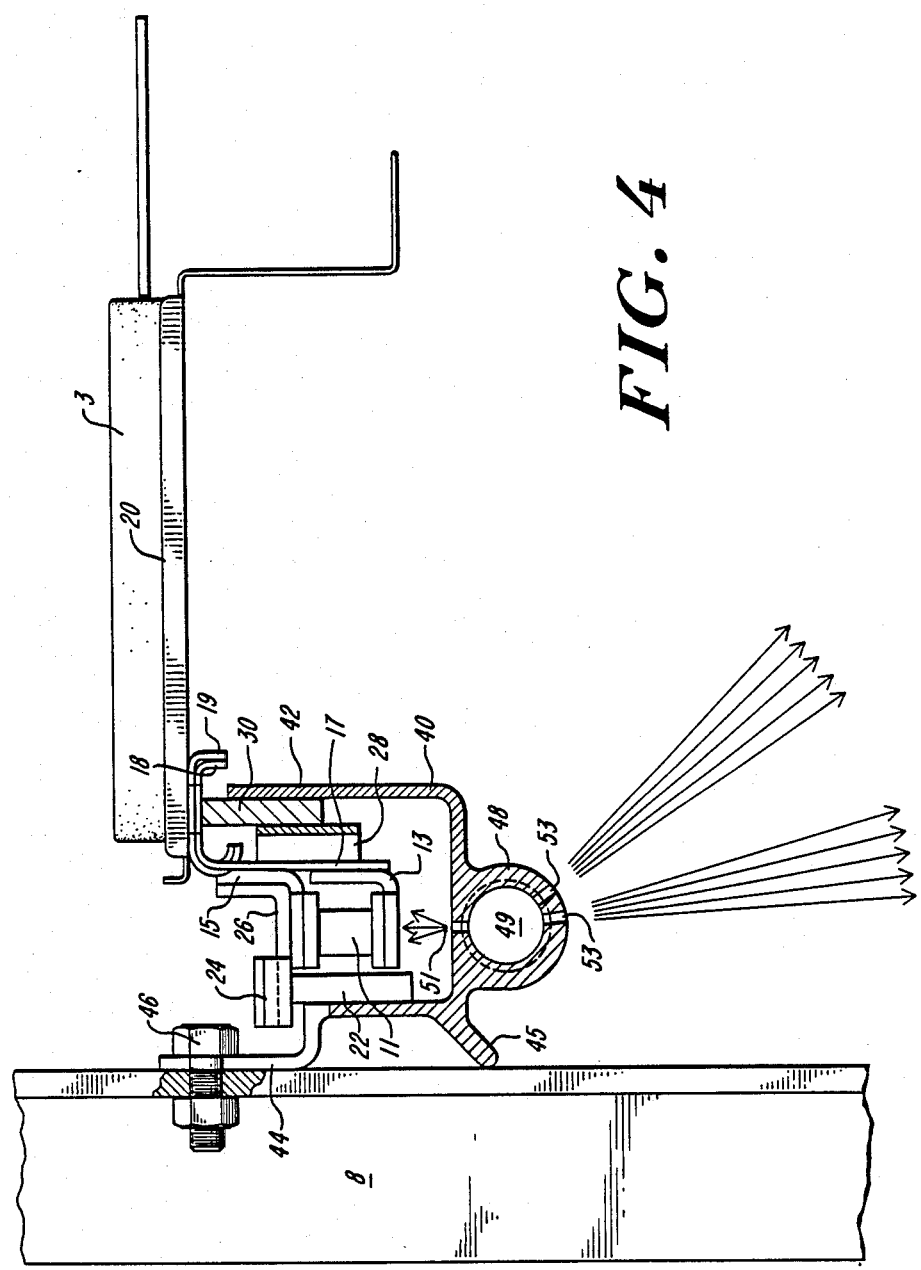
FIG. 4 is an enlarged view of a portion of the cross sectional view of FIG. 3.

FIG. 4 is an enlarged cross sectional view of the upper one of the rail members 5. The structural arrangement of the conveyor within the chamber is such that there are vertical frame members 8 carrying a series of support and guide rails, of which rails 4 and 5 are exemplary, forming the straight sections of an elongated spiral track with the product plates 20 carrying product 3 being carried on a flexible roller chain 11 over these rails.

In FIGS. 3 and 4 the conveyor moves along a direction of motion oriented perpendicular to the plane of the drawing. Vertical support members 8 are typically spaced every four feet along the length of the conveyor to support the conveyor guide rail structures 4 and 5. At the outboard end of the plates 20, other vertical members 10 provide support for an outer rail 62 which supports the outer end of the plate 20.

This outer rail is typically formed of a phenolic material supported on stand offs 64. The conveyor rail is formed of an elongated aluminum extrusion 40 which has a generally open U-shaped upper portion and an enclosed tubular bottom portion. The upper portion is formed by the outside leg member 42 on the outer side and a wall section on the inside which includes an angular projection 45 and an upper tab section 44. Bolt 46 fastens the conveyor rail 40 through tab 44 to the vertical member 8. The angularly set projection 45 of the extrusion side wall acts as a standoff to maintain mechanical support in the horizontal direction to the rail 40. A pair of link brackets 13 and 15 are attached to the upper surfaces of the chain link 11. These are right angle brackets to which is fastened the plate support member 17. The plate support member 17 is formed of steel stamping and has a generally elongated vertical section with a horizontal upper portion terminating in a downwardly extending rim 18. Support member 17 may be fastened to the link by rivets or other conventional means. Plate 20 is removably attached to this plate support member 17 by means of plate subbase 19. Plate subbase 19 is, again, a stamped steel member which is attached by means of a spot weld or similar means (not visible) to plate 20. It is shaped with a circled inner portion and a downwardly extending outer abutment generally aligned with the rim 18 of the plate support member 17. In the Figure plate 20 is shown attached to the plate support member 17 and thus to the chain link conveyor.

To detach the plate member 20 from the plate support member 17 the plate member 20 is rotated upward around the pivot point formed at the inner end of the latch member 19 until there is sufficient clearance to remove it entirely.

The plate support member 17 is supported within the extrusion 40 in such a fashion that it is constrained against downward vertical motion, or horizontal motion in a direction normal to the direction of travel of the chain. This is accomplished by means of an inner chain support rail 22, typically formed of phenolic material which is fastened by rivets or other suitable fixtures to the side wall of the extrusion 40. Attached to the upper link bracket 15 is a right angled member 26 carrying on it a steel slipper element 24 which rides on the phenolic plate support rail 22 and constrains the support member 17 from tilting upwardly from the horizontal. A second phenolic support rail 30 is mounted on leg 42 of the extrusion 40 and supports the plate support member 17 in a sliding relationship. In addition the outer side of support member 17 has a spaced out slipper face 28 which insures that the spacing between the support member 17 and the side rail 30 is maintained.

As discussed above a continuing problem with these conveyors is the necessity for providing them with a thorough cleaning at regular intervals. This is accomplished in the present invention by the inclusion of the tubular section 48 integral with the remainder of the extrusion. The outer diameter of the tubular section is approximately one inch with the wall thickness being approximately ⅛ of an inch, providing an inner diameter of the tube of approximately ¾ of an inch. As illustrated in FIGS. 3 and 4 there is a small orifice 51 on the top part of the tube and other orifices 53 in the bottom section of the tube. These orifices are spaced at regular intervals for example every six inches, along the length of the tube and typically have a diameter of perhaps 1/16th of an inch. The bore 49 of the tubular section 48 then provides a fluid passage the entire length of the rail. Fluid forced through this passage is ejected as a jet or spray through the orifices 53 and 51 and thus, after the freezing chamber has been brought up to room temperature, injection of rinse fluid and detergent and sanitizing fluids materials into this passage serves to clean and sanitize the conveyor chain assembly. Orifices 53 in each rail serve to wash the plates and rails forming the immediately adjacent lower strands. For example, the upper surfaces of rail 4 in FIG. 3 is washed by spray from orifices 53 in rail 5. Additional orifices can be positioned at other radial and longitudinal positions such that they can perform the same operations on other parts of the conveyor structure. At the conclusion of the wash cycle the fluids may be drained through the lower holes 53 or, since there is a tilt to the rails from one end to the other of the conveyor, it may be allowed to drain out at the lower end of the rail. While, as shown, the cleaning fluid may be provided at one end of the fluid passage way 49, the system could, of course, be arranged with a central access for the cleaning fluid which would then be fed in both directions along the passageway 49.

What is claimed is:

1. In a conveyor line system for conveying comestibles on plates carried by a flexible Chain conveyor the improvement comprising:

a support rail formed of an elongated extrusion having an upper portion carrying product plate support means for slidably supporting the product plates, said upper portion being attached to nonmoving frame members of the conveyor system, said extrusion being formed with an elongated tube portion integral with the upper portion, said elongated tube portion having a fluid passage extending therethrough and including orifices longitudinally and radially spaced and of sufficient size to provide fluid exits to the space beyond said tubes when fluid is passed through said passage to provide for cleaning action of said conveyor chain above said tube and of said rail, said product plates and said plate support means below said tubes.

2. A support rail in accordance with claim 1 wherein said upper portion of the extrusion is generally U-shaped and said product plate support means are rails each fixed to one leg of said U-shaped portion.

3. A support rail in accordance with claim 1 wherein said extrusion is aluminum.

4. A support rail in accordance with claim 1 wherein said product plate support rails are formed of a material suitable for linear bearing surfaces.

5. A support rail in accordance with claim 1 wherein said upper portion of the extrusion includes an integral tab portion for attaching to said frame members.

6. In a conveyor line system for conveying comestibles on plates carried by a flexible chain conveyor formed as an elongated spiral having multiple vertical levels, the improvement comprising:

a series of support rails vertically displaced from one another, each formed of an elongated extrusion having an upper portion carrying product plate support means for slidably supporting the product plates, said upper portion being attached to nonmoving frame members of the conveyor system, each of said extrusions being formed with an elongated tube portion integral with the upper portion, said elongated tube portion having a fluid passage extending therethrough and including orifices longitudinally and radially spaced and of sufficient size to provide fluid exits to the space beyond said tubes when fluid is passed through said passage to provide for cleaning action of said conveyor chain above said tube and of said rail, said product plates and said plate support means below said tubes.

* * * * *